(12) United States Patent
Mizumoto et al.

(10) Patent No.: US 6,384,556 B1
(45) Date of Patent: May 7, 2002

(54) MOTOR DRIVING CIRCUIT

(75) Inventors: Masao Mizumoto, Gunma; Koichiro Ogino, Ota; Tsutomu Shimazaki, Gunma, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/504,532

(22) Filed: Feb. 15, 2000

(30) Foreign Application Priority Data

Feb. 16, 1999 (JP) .............................. 11-037601

(51) Int. Cl.$^7$ .................................. H02P 1/00
(52) U.S. Cl. ...................... 318/293; 318/290; 318/294; 318/599
(58) Field of Search .................. 318/138, 245, 318/254, 439, 599, 293, 701, 294, 696, 685, 290, 603, 434, 362, 370; 388/804, 811, 819

(56) References Cited

U.S. PATENT DOCUMENTS

| 4,629,949 A | * | 12/1986 | Senso |
| 4,710,685 A | * | 12/1987 | Lehnohoff et al. |
| 4,879,641 A | * | 11/1989 | Rossi et al. |
| 4,924,158 A | * | 5/1990 | Kelley et al. |
| 5,598,074 A | * | 1/1997 | Huang |
| 5,744,922 A | * | 4/1998 | Neary et al. |
| 5,886,484 A | * | 3/1999 | Fucili et al. |
| 6,049,184 A | * | 4/2000 | Uggla et al. |
| 6,057,663 A | * | 5/2000 | Galbiati et al. |

* cited by examiner

*Primary Examiner*—Paul Ip
(74) *Attorney, Agent, or Firm*—Hogan & Hartson, L.L.P.

(57) ABSTRACT

In order to brake a brushless motor in a forward rotation to give a reverse rotation force, source-side and sink-side transistors for supplying driving circuits *a, *b, *c, *d, *e, *f are periodically switched on and switched off based on the oscillation frequency of an oscillator (13) when a both end voltage of a current detection resistance (10) is higher than a reference voltage Vref. Moreover, the transistors are kept in an ON state all the time when the both end voltage of the current detection resistance (1) has lowered below the reference voltage Vref. With this arrangement, damage to a source-side transistor due to a large current flowing thereinto when the motor rotating in a reverse direction can be prevented.

6 Claims, 4 Drawing Sheets

MOTOR DRIVING CIRCUIT

BACKGROUND OF THE INVENTION

1. Field of the Invention:

The present invention relates to a motor driving circuit preferable for motor control.

2. Description of the Related Art:

FIG. 2 is a circuitry diagram showing a driving section of a three phase motor.

A brushless motor comprises a rotor fixed a rotation axis (shaft) so as to oppose to a stator. U-phase, V-phase, W-phase driving coils 1, 2, 3, which are Y-connected to one another, are fixedly connected to the stator. Magnets are fixed to the rotor to form a plurality of poles. Hall elements are fixed to the stator. When the magnets pass above the driving coils 1, 2, 3 as the motor rotates, three sinusoidal wave signals, indicative of variation of a magnetic field, have a phase difference among one another of a 120° electrical degree are obtained by the Hall elements. NPN-type source-side transistor 4U and sink-side transistor 5U are connected in series between the power source Vcc and the ground Vss, and an emitter-collector connection therebetween is connected to the released-side end of the U-phase driving coil 1. NPN-type source-side transistor 4v and sink-side transistor 5V are connected in series between the power source Vcc and the ground Vss, and an emitter-collector connection therebetween is connected to the released-side end of the V-phase driving coil 2. NPN-type source-side transistor 4W and sink-side transistor 5W are connected in series between the power source Vcc and the ground Vss, and an emitter-collector connection therebetween is connected to the released-side end of the W-phase driving coil 3.

FIG. 3 is a diagram showing waveforms of a rotating motor.

Sinusoidal wave signals Uin, Vin, Win, obtained from the Hall elements are amplified, and then converted into logic signals Uulogic, Vlogic, Wlogic, each having three value levels, namely, high, middle and low. The source-side transistors 4U, 4V, 4W are switched on in response to an H-level logic signal, while the sink-side transistors 5U, 5V, 5W are switched on in response to an L-level logic signal. That is, during the period 1, or the first period of the hexa-divided one cycle of each of the logic signals Ulogic, Vlogic, Wlogic, the source-side transistor 4U and the sink-side transistor 5V are switched on, so that a driving current a flows. During the period 2, the source-side transistor 4U and the sink-side transistor 5W are switched on, so that a driving current b flows. During the period 3, the source-side transistor 4V and the sink-side transistor 5W are switched on, so that a driving current c flows. During the period 4, the source-side transistor 4V and the sink-side transistor 5U are switched on, so that a driving current d flows. During the period 5, the source-side transistor 4W and the sink-side transistor 5U are switched on, so that a driving current e flows. During the period 6, the source-side transistor 4W and the sink-side transistor 5V are switched on, so that a driving current f flows. These driving currents a, b, c, d, e, f, being sequentially supplied to the driving coils 1, 2, 3, generally cause the brushless motor to rotate in a forward direction. Note that, for driving the brushless motor at a constant speed, the sink-side transistors 5U, 5V, 5W are given PWM (pulse width modulation) control. Specifically, when the current rotation speed of the brushless motor is slower than the constant rotation speed, PWM control with high on-duty is applied. On the other hand, when the current rotation speed of the brushless motor is faster than the constant rotation speed, PWM control with high off-duty is applied.

FIG. 4 is a circuitry diagram including major elements, showing the state of flowing driving current d. Note that a driving coil 6 is a simplified representation of a serial body consisting of U-phase and V-phase driving coils 1, 2. Regenerative diodes 7U, 8U, 7V, 8V are for regenerating and absorbing kick-back voltage caused in the driving coil 6. A smoothing capacitor 9 smoothens ripples imposed on the power source Vcc. A current detection resistor 10 converts an output current of a source-side and sink-side transistors which then remain in an ON state. Specifically, a voltage between both ends of the current detection resistor 10 is compared with a reference voltage. When the detected voltage is higher than a reference voltage, it is determined that an excessive current, or a current higher than a regular value, is supplied to the source-side and sink-side transistors. Based on such a detection result, one of sink-side transistors that is under PWM control is switched off as current limit function.

To control the brushless motor, inverted (reverse) currents of the driving currents a, b, c, d, e, f, namely inverted driving currents *a, *b, *c, *d, *e, *f, are sequentially supplied to the driving coils 1, 2, 3. Specifically, in the case of FIG. 4, the source-side transistor (4V) and the sink-side transistor (5U), which then remain in an ON state, are switched off, and the source-side transistor (4U) and the sink-side transistor (5V) are switched on to thereby flow driving current *d, indicated by the broken line.

FIGS. 5A and 5B are waveform diagrams illustrating the relationship between a counter electromotive voltage and a driving voltage for any one of the U-phase, V-phase, and W-phase coils when the brushless motor is rotated in either a forward or reverse direction. In order to rotate the brushless motor in a forward direction, a source-side transistor of the concerned phase is switched on during a period corresponding to an electrical degree 120° with a positive voltage waveform, and a sink-side transistor of that phase is switched on during a period corresponding to an electrical degree 120° with a negative voltage waveform (FIG. 5A). In U-phase example, in order to rotate the brushless motor in a forward direction, an output current equivalent to a counter electromotive voltage divided by a resistance value of the driving coil 6, indicated by the slanting lines, may flow through the source-side and sink-side transistors 4U, 5U.

On the other hand, in order to rotate the brushless motor in a reverse direction, a sink-side transistor of the concerned phase is switched on during a period corresponding to an electrical degree 120° with a positive voltage waveform, and a source-side transistor of that phase is switched on during a period corresponding to an electrical degree120° with a negative voltage waveform (FIG. 5B). That is, when a brushless motor being in a forward rotation is changed to rotate in a reverse direction for control application, in the case of U-phase, for example, an output current, indicated by the slanting lines, may flow through the source-side and sink-side transistors 4U, 5U, which is larger than that which would flow therethrough in a forward rotation. As the voltage between the two ends (a both end voltage) of the current detection resistance 10 receiving an output current when the motor is rotating in a reverse rotation is larger than a reference voltage, a current limit function is applied to turn off the sink-side transistor 5U.

When the source-side transistor 4U is switched on and the sink-side transistor 5V is switched off under the above current *d conditions, the sink-side transistor 5V is caused to switch off because the output current is too large. The source-side transistor 4U, however, remains in an ON state. As a result, a regenerative current *d continues to flow through a close loop (*d loop), including the source-side transistor 4U, the driving coil 6, and the regenerative diode 7V. As a large current then flows into the source-side transistor 4U, the source-side transistor 4U may be forced to face the risk of being destroyed. A similar problem would be caused by the flow of driving currents a, b, c, e, f.

SUMMARY OF THE INVENTION

In light of this problem, according to the present invention, there is provided a motor driving circuit for preventing the continuous flow of a large current into an output transistor when motor control is applied.

According to the present invention, source-side and sink-side transistors are repeatedly switched on and switched off when a large motor driving current is applied. With this arrangement, a current to flow through the both transistors can be limited. In particular, when braking the motor by providing a reverse drive current, a large current may be caused and, according to a method in which a sink-side transistor is switched on in such a situation, there may be a risk that a large current may flow through the source-side transistor. The present invention can prevent such a risk.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

The present invention will be described in detail referring to the accompanying drawings.

Figure 1:
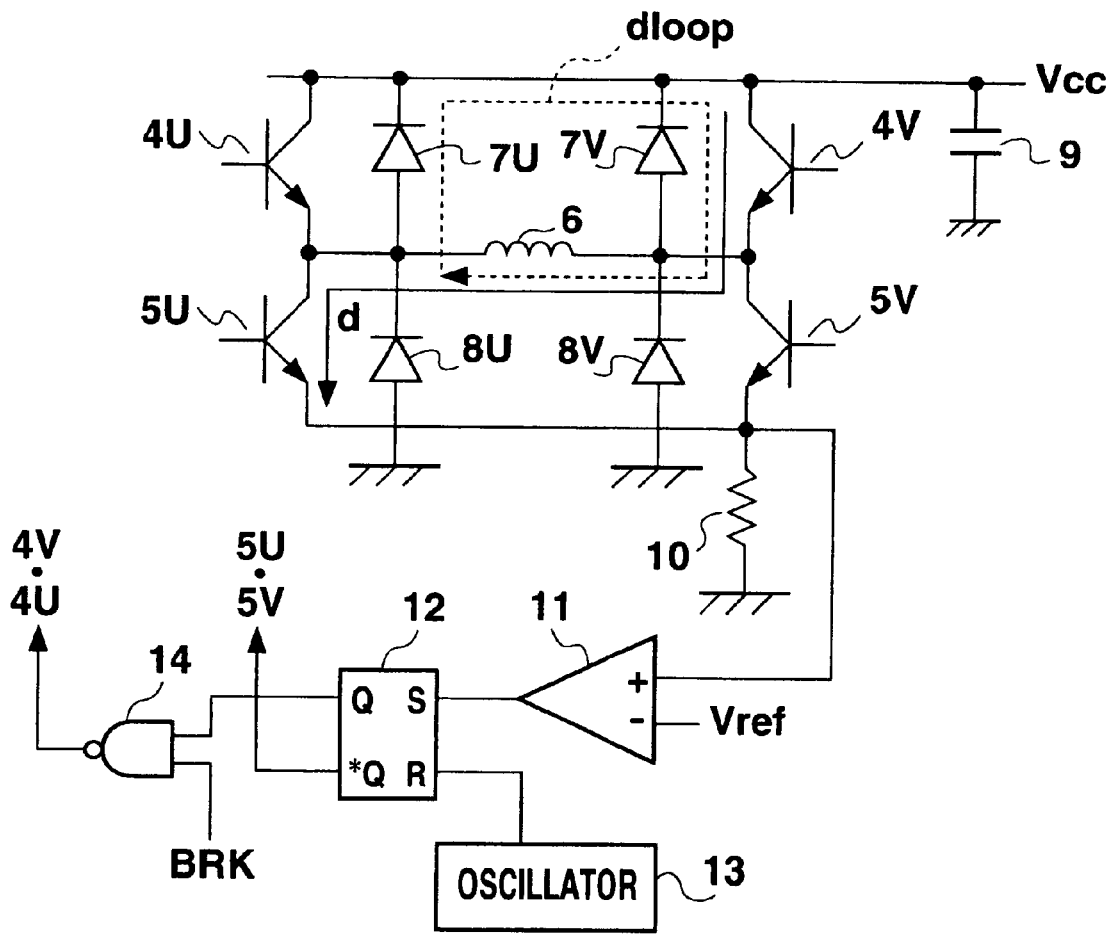
FIG. 1 is a circuitry diagram showing a motor driving circuit according to the present invention.
Figure 2:
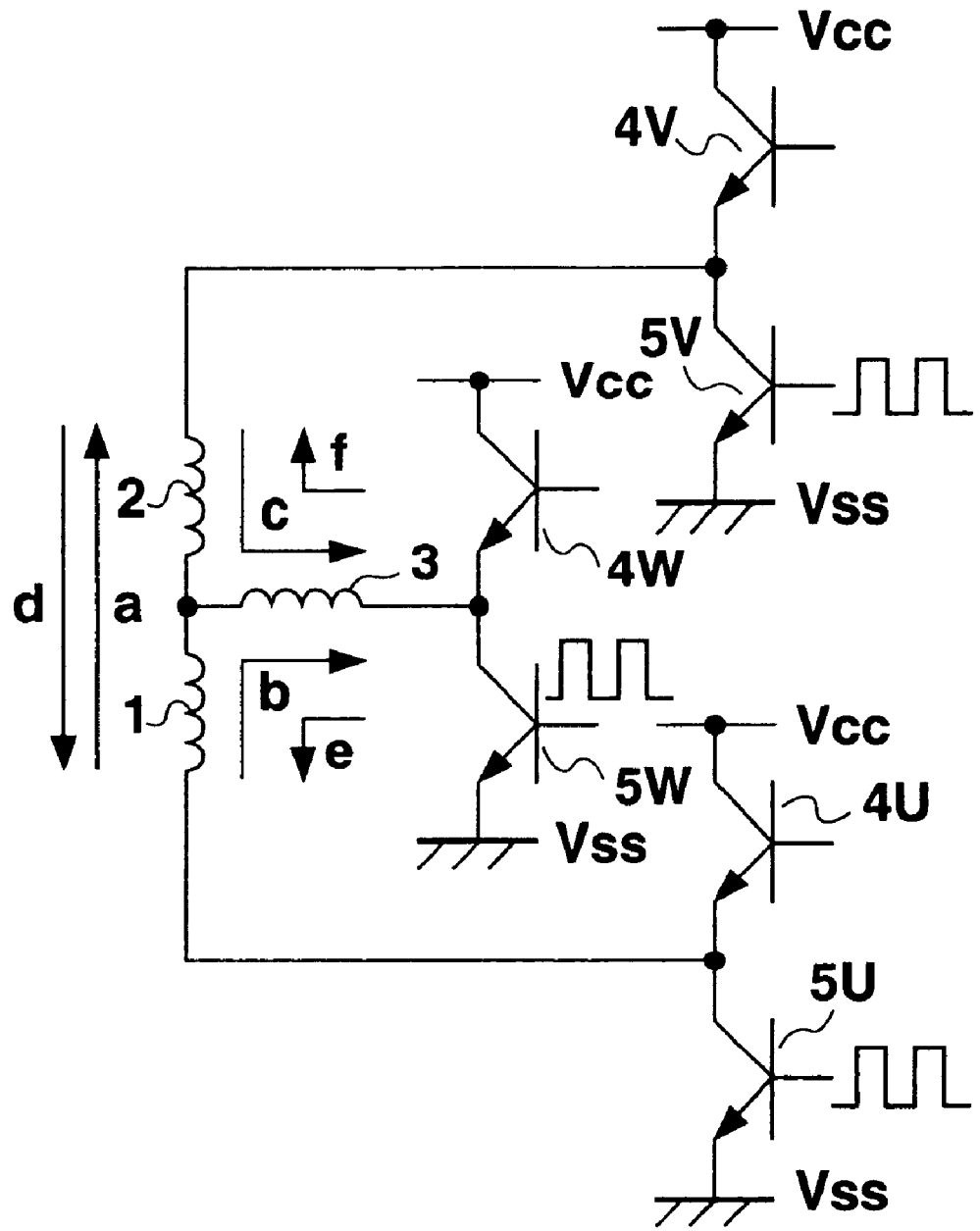
FIG. 2 is a circuitry diagram showing a driving section of a general three-phase motor.
Figure 3:
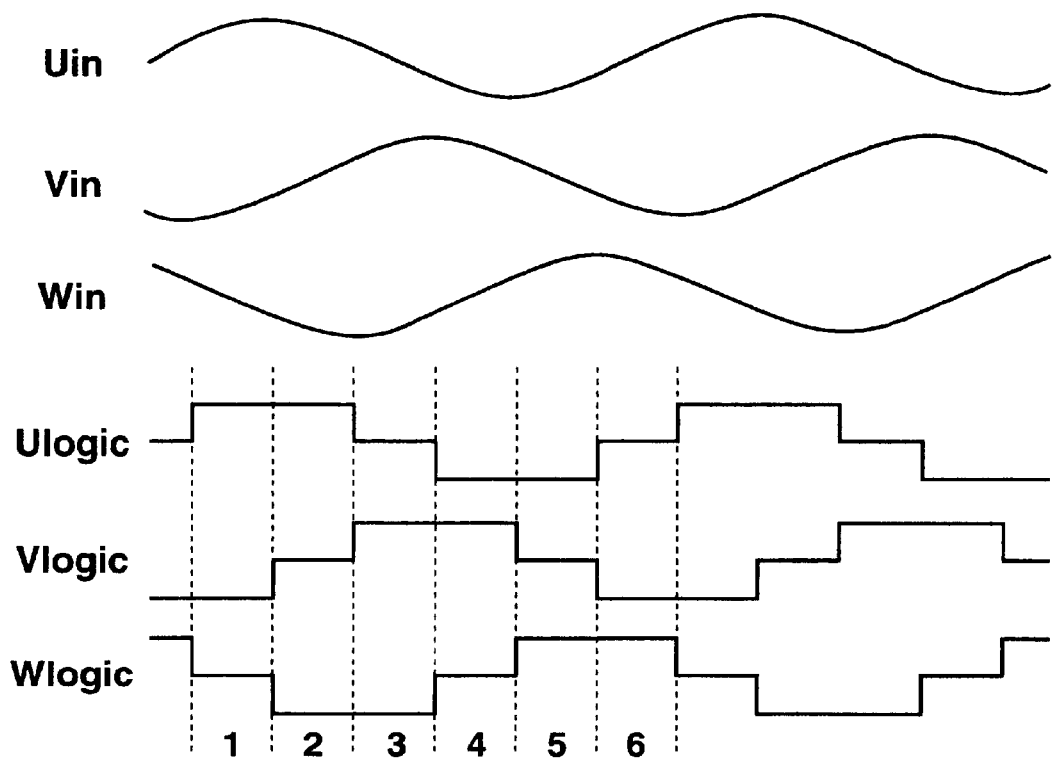
FIG. 3 is a diagram showing waveforms with a motor in general rotation.
Figure 4:
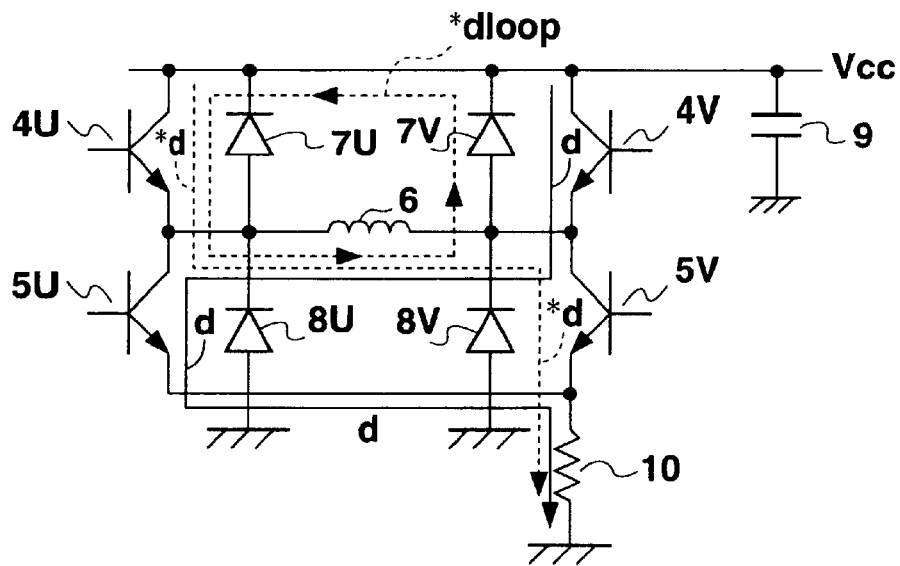
FIG. 4 is a circuitry diagram showing major elements of FIG. 2.
Figure 5A:
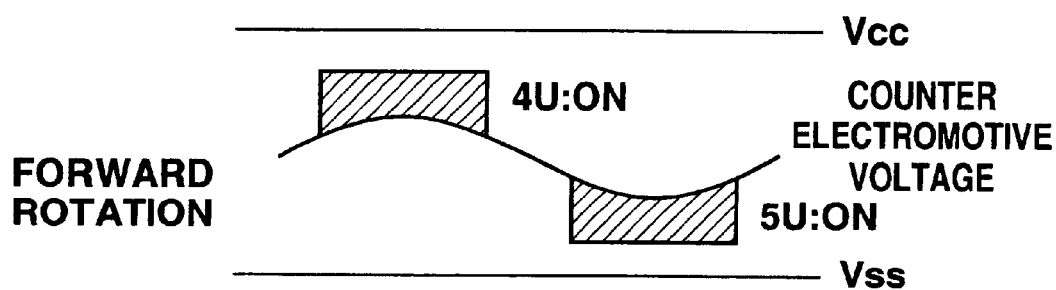
FIGS. 5A and 5B are diagrams illustrating relationship between counter electromotive voltage and a driving voltage when a motor rotates in either a forward or reverse direction.
Figure 5B:
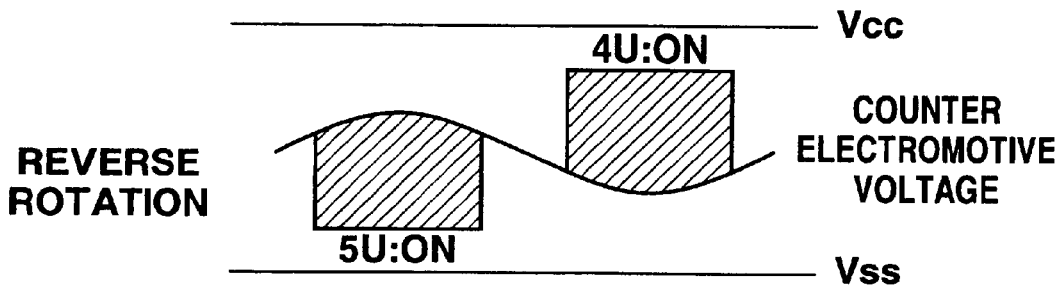

FIG. 1 is a circuitry diagram showing a motor driving circuit according to the present invention. In this example, a driving current d flows, and the brushless motor rotates in a forward direction. Identical elements to those already explained for FIG. 4 are given identical reference numbers, and their explanation is not repeated here.

Referring to FIG. 1, a comparison circuit 11 compares a voltage between the ends (both end voltage) of the current detection resistor 10 and a reference voltage Vref, and supplies an H-level output when the voltage of the current detection resistor 10 is higher than the reference voltage Vref. An RS flip flop 12 has an S (set) terminal, connected to an output of the comparison circuit 11, and an R (reset) terminal, connected to an oscillator 13, which oscillates at a specific frequency. That is, the RS flip flop 12 is set when the voltage of the current detection resistor 10 is higher than the reference voltage Vref, and reset in a cycle unit based on the specific frequency. A *Q terminal (inverse Q) of the RF flip flop 12 is connected to the base of the sink-side transistor 5V, while a Q terminal thereof is connected, via an NAND gate 14, to the base of the source-side transistor 4U. The NAND gate 14 is caused open in response to an H-level (active) control instruction signal BRK that is higher during a braking period. Note that a logical product output of a *Q terminal output of the RS flip flop 12 and a logical product output of a NAND gate 14 is supplied via OR gates to the bases of the source-side transistors 4U, 4V, 4W and sink-side transistors 5U, 5V, 5W which cause driving currents *a, *b, *c, *e, *f. The other input terminals of the OR gates receive control signals for the respective drive transistors.

In the an example is described wherein driving currents a, b, c, d, e, f are sequentially flowing through the driving coils 1, 2, 3, so that a brushless motor rotates in a forward direction, and, in particular, where the source-side transistor 4V and the sink-side transistor 5U remain in an ON state so that current d flows. When the both end voltage of the current detection resistor 10 exceeds a reference voltage Vref under the above condition, the RS flip flop 12 is set in response to an H-level output from the comparison circuit 11, and a *Q output becomes of an L-level, so that the sink-side transistor 5U is switched off. At this point, as an output from the NAND gate 14 remains at H-level, and the source-side transistor 4V therefore remains in an ON state, a regenerative current d loop still flows through the close loop, including the source-side transistor 4V, the driving coil 6, and the regenerative diode 7U. However, as the flowing regenerative current does not become large enough to destroy the source-side transistor 4V, no problems will result, and the both end voltage of current detection resistance 10 gradually decreases.

When a control instruction signal BRK for controlling the brushless motor is changed to an H-level for braking while the brushless motor is then rotating in a forward direction, reverse rotation logic process is applied to cause driving currents *a, *b, *c, *d, *e, *f. As a result, the source-side and sink-side transistors 4V, 5U are switched off, while the source-side and sink-side transistors 4U, 5V are switched on. As a both end voltage of the current detection resistance 10 then instantly exceeds a reference voltage Vref, the RS flip flop 12 is set in response to an H-level output from the comparison circuit 11, and the source-side and sink-side transistors 4U and 5V are simultaneously switched off.

Meanwhile, the RS flip flop 12 is periodically reset in response to an oscillation clock from the oscillator 13, though it is receiving an H-level output at an S terminal thereof, so that the source-side and the sink-side transistors 4U, 5V are again switched on. That is, when the both end voltage of the current detection resistance 10 is higher than a reference voltage Vref, the source-side and the sink-side transistors 4U, 5V are repeatedly switched on and off at an oscillation frequency of the oscillator 13. As the source-side and the sink-side transistors 4v, 5V are then switched off at the same time, no regenerative current is caused. Through repetitive operation of the above, the brushless motor is decelerated. When a both end voltage of the current detection resistance 10 has been lowered below the reference voltage Vref, the source-side and sink-side transistors 4U, 5V, which are then freed from the risk of being destroyed, are allowed to be switched on and thereafter remain continuously ON. Through repetition of a series of the above operations, the brushless motor is controlled. Note that the oscillation frequency of the oscillator 13 is not affected by variation of an output from the comparison circuit 11, as is necessary to prevent oscillation of a circuit, heat generation, audible noise generation, and so on. Also note that an output of the oscillator 13 may preferably be supplied to the flip flop 12 only when control operation is applied.

As described above, in order to brake a brushless motor rotating in a forward rotation by generating a reverse direction force, source-side and sink-side transistors for causing driving currents *a, *b, *c, *d, *e, *f are switched on and switched off periodically based on an oscillation frequency of the oscillator 13 when a both end voltage of the current detection resistance 10 is in excess of the reference voltage Vref, and allowed to be switched on and thereafter remain continuously ON when a both end voltage of the current detection resistance 10 has been lowered below the reference voltage Vref. With this arrangement, damage due to a large current to transistors used when rotating the motor in a reverse direction can be prevented.

What is claimed is:

1. A motor driving circuit having a plurality of pairs of a source-side transistor and a sink-side transistor being serially connected between a first power source and a second power source, wherein a source-side transistor and a sink-side transistor which belong to different pairs are sequentially switched on to supply a driving current to a motor coil connected between connections each between a source-side transistor and a sink-side transistor constituting a pair, the motor driving circuit comprising:

a detection circuit for detecting a motor driving current; and a control circuit for periodically switching on and off at least a source-side transistor and a sink-side transistor respectively of different pairs through which the motor driving current flows, in a predetermined cycle when the motor driving current detected by the detection circuit is more than a predetermined value, wherein (i) a source-side transistor of a first pair is on and a sink-side transistor of a second pair is periodically on and off to rotate the motor, and (ii) during the situation recited in (i), the following action is performed when a braking instruction is generated:

(a) said source-side transistor of the first pair and said sink-side transistor of the second pair is off, and (b) a sink-side transistor of said first pair and a source-side transistor of said second pair is periodically on and off when the driving current is more than a predetermined value.

2. A circuit according to claim 1, wherein the control circuit switches on and off the source-side transistor and the sink-side transistor when a reverse current is supplied to the motor.

3. A circuit according to claim 2, wherein the detection circuit outputs a detection value of the motor driving current as a detection voltage value.

4. A circuit according to claim 3, wherein the detection circuit has a resistance provided between a plurality of sink-side transistors and the second power source, and outputs a voltage of the resistance on the sink-side transistor side thereof.

5. A circuit according to claim 3, further comprising a comparator for comparing the detection voltage value and a predetermined value.

6. A circuit according to claim 5, further comprising a flip flop having a set input terminal for receiving an output from the comparator, and a reset input terminal for receiving an AC voltage of a predetermined cycle, for outputting a signal to simultaneously switch on or switch off the source-side transistor and the sink-side transistor.

* * * * *